US007043075B2

(12) United States Patent
Gutta

(10) Patent No.: US 7,043,075 B2
(45) Date of Patent: May 9, 2006

(54) COMPUTER VISION SYSTEM AND METHOD EMPLOYING HIERARCHICAL OBJECT CLASSIFICATION SCHEME

(75) Inventor: Srinivas Gutta, Yorktown Heights, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 714 days.

(21) Appl. No.: 10/183,821

(22) Filed: Jun. 27, 2002

(65) Prior Publication Data

US 2003/0059106 A1  Mar. 27, 2003

Related U.S. Application Data

(60) Provisional application No. 60/325,399, filed on Sep. 27, 2001.

(51) Int. Cl.
G06K 9/62 (2006.01)
(52) U.S. Cl. ............................ 382/158; 382/224; 706/20
(58) Field of Classification Search ................ 382/224, 382/159, 103, 156, 158, 226, 227; 707/1, 707/102, 6; 706/31, 20, 25; 348/169
See application file for complete search history.

(56) References Cited

U.S. PATENT DOCUMENTS

| 5,572,604 | A | 11/1996 | Simard | 382/224 |
| 5,940,535 | A | 8/1999 | Huang | 382/201 |
| 6,249,606 | B1 | 6/2001 | Kiraly et al. | 382/195 |
| 6,678,413 | B1 * | 1/2004 | Liang et al. | 382/181 |
| 6,754,389 | B1 * | 6/2004 | Dimitrova et al. | 382/224 |
| 6,778,705 | B1 * | 8/2004 | Gutta et al. | 382/224 |
| 6,807,361 | B1 * | 10/2004 | Girgensohn et al. | 386/52 |

FOREIGN PATENT DOCUMENTS

EP 1096418 A2 2/2001

OTHER PUBLICATIONS

Jain et al., "Appearance Based Generic Object Recognition," Proc. of Indian Conf. on Computer Vision, Graphics and Image Processing, Bangalore, India (Dec. 22-22, 2000).
Ross et al., "Learning User-Specific Thresholds and Weights in Multibiometric Authentication Systems," (Apr. 23, 2002).

* cited by examiner

*Primary Examiner*—Sheela Chawan

(57) ABSTRACT

A method and apparatus are disclosed for classifying objects using a hierarchical object classification scheme. The hierarchical object classification scheme provides candidate classes with an increasing degree of specificity as the hierarchy is traversed from the root node to the leaf nodes. Each node in the hierarchy has an associated classifier, such as a Radial Basis Function classifier, that determines a probability that an object is a member of the class associated with the node. The nodes of the hierarchical tree are individually trained by any learning technique, such as the exemplary Radial Basis Function Network, that uses appearance-based information of the objects under consideration to classify objects. A disclosed recognition scheme uses a decision criterion based upon recognition error to classify objects.

22 Claims, 5 Drawing Sheets

COMPUTER VISION SYSTEM AND METHOD EMPLOYING HIERARCHICAL OBJECT CLASSIFICATION SCHEME

CROSS REFERENCE TO RELATED APPLICATIONS

This application claims the benefit of U.S. Provisional Application No. 60/325,399, filed Sep. 27, 2001. In addition, this application is related to U.S. patent application Ser. No. 09/794,443, filed Feb. 27, 2001, entitled "Classification of Objects Through Model Ensembles," incorporated by reference herein.

FIELD OF THE INVENTION

The present invention relates to computer vision systems, and more particularly, to the classification of objects in image data based on a hierarchical object classification scheme.

BACKGROUND OF THE INVENTION

Computer vision techniques are increasingly used to automatically detect or classify objects or events in images. The ability to differentiate among objects is an important task for the efficient functioning of many computer vision systems. For example, in certain applications it is important for a computer vision system to distinguish between animate objects, such as people and pets, and inanimate objects, such as furniture and doors. Pattern recognition techniques, for example, are often applied to images to determine a likelihood (probability) that a given object or class of objects appears in the image. For a detailed discussion of pattern recognition or classification techniques, see, for example, R. O. Duda and P. Hart, Pattern Recognition and Scene Analysis, Wiley, New York (1973); R. T. Chin and C. R. Dyer, "Model-Based Recognition in Robot Vision," ACM Computing Surveys, 18(1), 67–108 (March, 1986); or P. J. Besl and R. C. Jain, "Three-Dimensional Object Recognition," Computing Surveys, 17(1), 75–145 (March, 1985), each incorporated by reference herein.

Appearance based techniques have been extensively used for object recognition because of their inherent ability to exploit image based information. Appearance based techniques attempt to recognize objects by finding the best match between a two-dimensional image representation of the object appearance and stored prototypes. Generally, appearance based methods use a lower dimensional subspace of the higher dimensional representation for the purpose of comparison. Common examples of appearance based techniques for recognition and classification of objects include Principle Component Analysis (PCA), Independent Component Analysis (ICA) and Neural Networks.

U.S. patent application Ser. No. 09/794,443, filed Feb. 27, 2001, entitled "Classification of Objects Through Model Ensembles," and T. Brodsky et al., "Visual Surveillance in Retail Stores and in the Home," Proc. $2^{nd}$ European Workshop on Advanced Video-Based Surveillance Systems, 297–310 (2001), disclose an object classification engine that distinguishes between people and pets in a residential home environment. Initially, speed and aspect ratio information are used to filter out invalid moving objects, such as furniture. Thereafter, gradient images are extracted from the remaining objects and applied to a Radial Basis Function Network (RBFN) to classify moving objects as people or pets.

While currently available classification schemes perform well in a closed environment, such as a residential home, they suffer from a number of limitations, which if overcome, could greatly improve the ability of such classification schemes to classify unknown objects. In particular, while most conventional classification schemes exploit known information about the form or function of these objects, few, if any, classification schemes currently attempt to build object category hierarchies using purely image-based information.

SUMMARY OF THE INVENTION

Generally, a method and apparatus are disclosed for classifying objects using a hierarchical object classification scheme. The hierarchical object classification scheme provides candidate classes with an increasing degree of specificity as the hierarchy is traversed from the root node to the leaf nodes. Each node in the hierarchy has an associated classifier, such as a Radial Basis Function classifier, that determines a probability that an object is a member of the class associated with the node.

The nodes of the hierarchical tree are individually trained by any learning technique, such as the exemplary Radial Basis Function Network, that uses appearance-based information of the objects under consideration to classify objects. In one implementation, a collection of sequences of a set of model objects are processed during a training phase, and horizontal, vertical and combined gradients are extracted for each object to form a set of image vectors corresponding to each object. Thereafter, a Radial Basis Function network is generated for each such set of image vectors and a hierarchy of appearance classes is constructed using the information about categories.

According to another aspect of the invention, a recognition scheme uses a decision criterion based upon recognition error to classify objects. An exemplary hierarchical classification process performs a top-down object classification using a recognition error criterion. An image sequence containing an unknown object is initially applied to the Radial Basis Function classifier associated with the first two levels of the hierarchical object classification scheme to compute the recognition error corresponding to each node. The recognition error at next level is sequentially compared to the recognition error at the current level, until the node having the lowest recognition error is identified. An unknown object is then classified as a member of the class associated with the node having the lowest recognition error.

A more complete understanding of the present invention, as well as further features and advantages of the present invention, will be obtained by reference to the following detailed description and drawings.

DETAILED DESCRIPTION

The present invention provides a hierarchical object classification scheme that provides a small number of candidate classes with an increasing degree of specificity as the hierarchy is traversed from top to bottom. As discussed further below in conjunction with FIG. 2, the nodes of the tree are individually trained by any learning technique, such as a Radial Basis Function Network, that uses appearance-based information of the objects under consideration to classify objects. According to another aspect of the invention, a recognition scheme uses a decision criterion based upon recognition error for the purpose of classification. While the exemplary embodiment discussed herein employs Radial Basis Function Networks, it is noted that any appearance-based classifier can be employed by the present invention, as would be apparent to a person of ordinary skill in the art. For example, neural networks employing Principle Component Analysis (PCA) or Independent Component Analysis (ICA), or a classifier based on Bayesian techniques or Linear Discriminant Analysis (LDA), could also be employed, as would be apparent to a person of ordinary skill.

Figure 1:
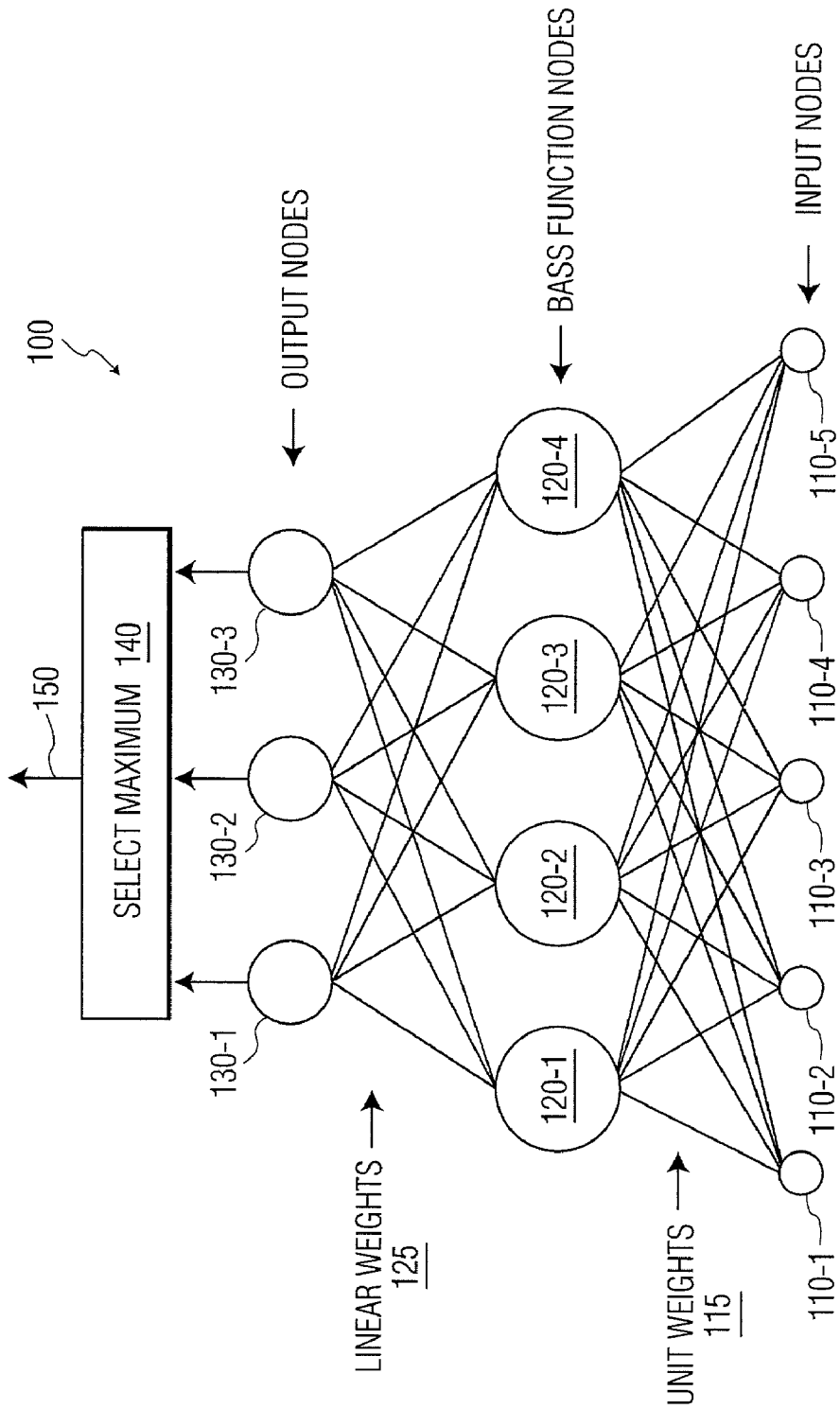
FIG. 1 illustrates an exemplary prior art classifier that uses Radial Basis Functions (RBFs)

FIG. 1 illustrates an exemplary prior art classifier 100 that uses Radial Basis Functions (RBFs). As described in more detail below, construction of an RBF neural network used for classification involves three different layers. An input layer is made up of source nodes, referred to herein as input nodes. The second layer is a hidden layer whose function is to cluster the data and, generally, to reduce its dimensionality to a limited degree. The output layer supplies the response of the network to the activation patterns applied to the input layer. The transformation from the input space to the hidden-unit space is non-linear, whereas the transformation from the hidden-unit space to the output space is linear.

Thus, the classifier 100 comprises (1) an input layer comprising input nodes 110 and unit weights 115, which connect the input nodes 110 to Basis Function (BF) nodes 120; (2) a "hidden layer" comprising basis function nodes 120; and (3) an output layer comprising linear weights 125 and output nodes 130. For pattern recognition and classification, a select maximum device 140 and a final output 150 are added.

It is noted that unit weights 115 are such that each connection from an input node 110 to a BF node 120 essentially remains the same (i.e., each connection is "multiplied" by a one). However, linear weights 125 are such that each connection between a BF node 120 and an output node 130 is multiplied by a weight. The weight is determined and adjusted during a training phase, as described below in conjunction with FIG. 4.

In the example of FIG. 1, there are five input nodes 110, four BF nodes 120, and three output nodes 130. However, FIG. 1 is merely exemplary and, in the description given below, there are D input nodes 110, F BF nodes 120, and M output nodes 130. Each BF node 120 has a Gaussian pulse nonlinearity specified by a particular mean vector $\mu_i$ and variance vector $\sigma_i^2$, where i=1, . . . , F and F is the number of BF nodes 120. Note that $\sigma_i^2$ represents the diagonal entries of the covariance matrix of Gaussian pulse i. Given a D-dimensional input vector X, each BF node i outputs a scalar value $y_i$, reflecting the activation of the BF caused by that input, as follows:

$$y_i = \varphi_i(\|X - \mu_i\|) = \exp\left[-\sum_{k=1}^{D} \frac{(x_k - \mu_{ik})^2}{2h\sigma_{ik}^2}\right], \quad \{1\}$$

where h is a proportionality constant for the variance, $x_k$ is the kth component of the input vector $X=[x_1, x_2, \ldots, x_D]$, and $\mu_{ik}$ and $\phi_{ik}$ are the kth components of the mean and variance vectors, respectively, of basis node i. Inputs that are close to the center of a Gaussian BF result in higher activations, while those that are far away result in lower activations. Since each output node of the RBF classifier 100 forms a linear combination of the BF node 120 activations, the part of the network 100 connecting the middle and output layers is linear, as shown by the following:

$$z_j = \sum_i w_{ij} y_i + w_{oj}, \quad \{2\}$$

where $z_j$ is the output of the jth output node, $y_i$ is the activation of the ith BF node, $w_{ij}$ is the weight connecting the ith BF node to the jth output node, and $w_{oj}$ is the bias or threshold of the jth output node. This bias comes from the weights associated with a BF node 120 that has a constant unit output regardless of the input.

An unknown vector X is classified as belonging to the class associated with the output node j with the largest output $z_j$, as selected by the select maximum device 140. The select maximum device 140 compares each of the outputs from the M output nodes to determine final output 150. The final output 150 is an indication of the class that has been selected as the class to which the input vector X corresponds. The linear weights 125, which help to associate a class for the input vector X, are learned during training. The weights $w_{ij}$ in the linear portion of the classifier 100 are generally not solved using iterative minimization methods such as gradient descent. Instead, they are usually determined quickly and exactly using a matrix pseudoinverse technique. This technique and additional information about RBF classifiers are described, for example, in R. P. Lippmann and K. A. Ng, "Comparative Study of the Practical Characteristic of Neural Networks and Pattern Classifiers," MIT Technical Report 894, Lincoln Labs. (1991); C. M. Bishop, "Neural Networks for Pattern Recognition," Ch. 5 (1995); J. Moody & C. J. Darken, "Fast Learning in Networks of Locally Tuned Processing Units", Neural Computation, vol. 1, 281–94 (1989); or Simon Haykin, "Neural Networks: A Comprehensive Foundation," Prentice Hall, 256–317 (1999), each incorporated by reference herein.

Detailed algorithmic descriptions of training and using RBF classifiers are well known in the art. Here, a simple algorithmic description of training and using an RBF classifier will now be described. Initially, the size of the RBF network is determined by selecting F, the number of BFs. The appropriate value of F is problem-specific and usually depends on the dimensionality of the problem and the complexity of the decision regions to be formed. In general, F can be determined empirically by trying a variety of Fs, or it can set to some constant number, usually larger than the input dimension of the problem.

After F is set, the mean $m_i$ and variance $\sigma_i^2$ vectors of the BFs can be determined using a variety of methods. They can be trained, along with the output weights, using a backpropagation gradient descent technique, but this usually requires a long training time and may lead to suboptimal local minima. Alternatively, the means and variances can be determined before training the output weights. Training of the networks would then involve only determining the weights.

The BF centers and variances are normally chosen so as to cover the space of interest. Different techniques have been suggested. One such technique uses a grid of equally spaced BFs that sample the input space. Another technique uses a clustering algorithm such as K-means to determine the set of BF centers, and others have chosen random vectors from the training set as BF centers, making sure that each class is represented. For a further discussion of RBFNs, see, for example, U.S. patent application Ser. No. 09/794,443, filed Feb. 27, 2001, entitled "Classification of Objects Through Model Ensembles," incorporated by reference herein.

Figure 2:
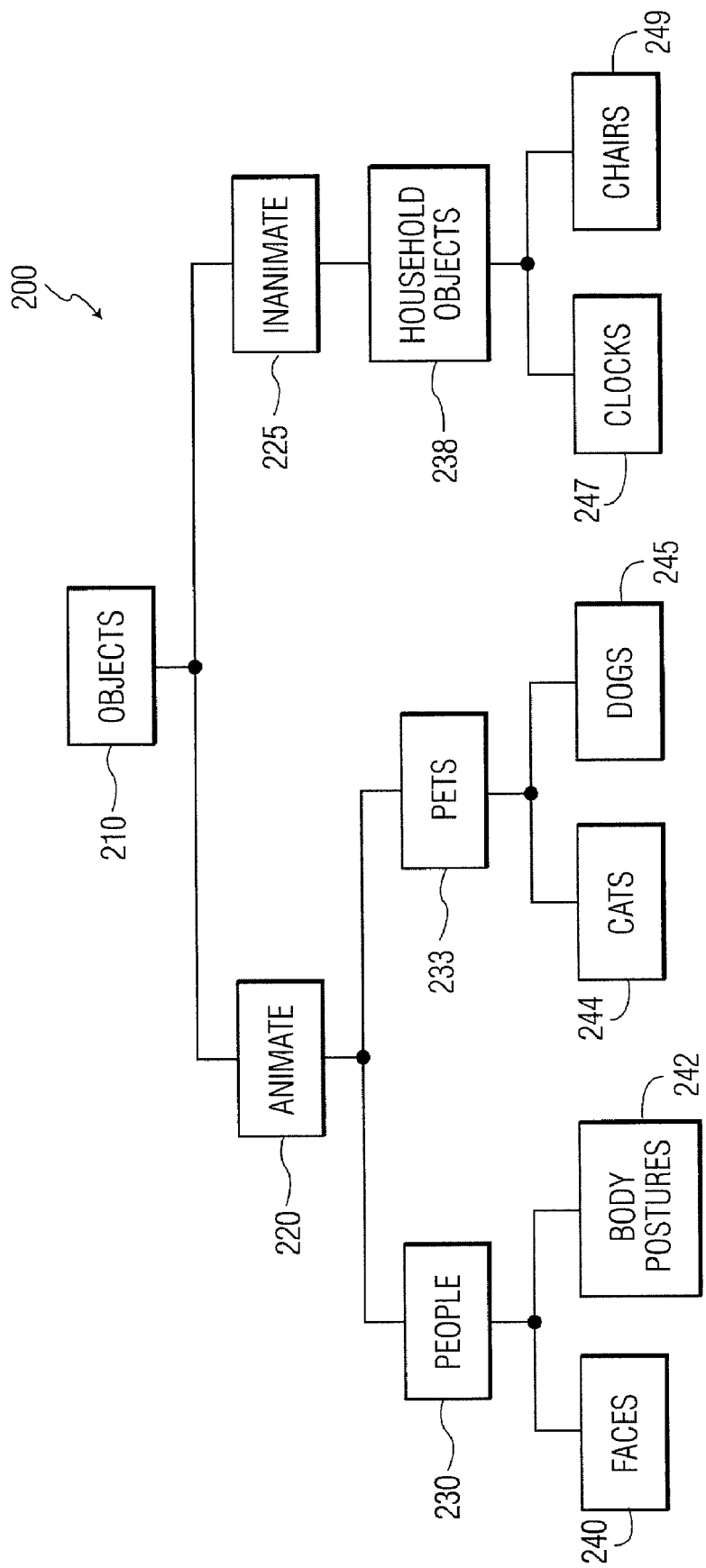
FIG. 2 illustrates an exemplary hierarchical object classification scheme employed by a pattern classification system in accordance with the present invention.

FIG. 2 illustrates an exemplary hierarchical object classification scheme 200 in accordance with a preferred embodiment of the invention. Generally, the hierarchical object classification scheme 200 should provide a small number of candidate classes at each stage with an increasing degree of specificity. As shown in FIG. 2, the exemplary hierarchical object classification scheme 200 has a root node 210 associated with the class "objects." The child nodes 220, 225 of the root node 210 (in the second level of the tree 200) are associated with the classes "animate" and "inanimate," respectively. The child nodes 230, 233 of the "animate" node 220 are associated with the classes "people" and "pets," respectively. The child node 238 of the "inanimate" node 225 is associated with the class "household objects." Finally, the leaf nodes 240, 242, 244, 245, 247 and 249 are associated with the classes "faces," "body postures," "cats," "dogs," "clocks" and "chairs," respectively.

It is noted that a given node in the tree 200 can be programmed with rules that indicate properties of the node that are inherited from ancestor nodes. For example, the node 240, associated with the class "faces," can be programmed with rules indicating that any object classified as a "face" has automatically inherited the properties that objects in the class are "animate" objects of class "people." Alternatively, these inherited properties can be determined by applying a given object to all nodes in the tree 200 to identify the properties satisfied by the object.

Each node in the tree 200 will have an associated Radial Basis Function classifier 100, such as the Radial Basis Function classifier 100 shown in FIG. 1. As discussed below in conjunction with FIG. 4, the Radial Basis Function classifiers 100 that are associated with leaf nodes in the hierarchical object classification scheme 200 are generally trained using a ground truth data set that is known to belong to the class associated with the node, thereby ensuring that the RBFN network is responsive to the characteristics of that particular class. For RBF neural networks associated with other (non-leaf) nodes in the hierarchical object classification scheme 200, the corresponding Radial Basis Function classifier 100 is trained using training data from the child nodes below the node that is being trained.

Generally, each Radial Basis Function classifier 100 will indicate the probability that a given object is a member of the class associated with the corresponding node. It is further noted that one or more nodes in the tree 200, such as the node 240 associated with the class "faces," can have subclasses associated therewith. For example, the Radial Basis Function classifier 100 associated with the node 240 can also optionally perform a face recognition and provide an indication of a likelihood that a face is a particular person.

In one embodiment, a given object can be applied to the nodes in the hierarchical object classification scheme 200 using a top-down approach. Once an object is classified as belonging to a particular class in a given level of the tree 200 then only the Radial Basis Function classifiers 100 associated with the child nodes of identified class need to be evaluated in the next level, as the tree 200 is traversed. Alternatively, a given object can be directly applied to all of the leaf nodes 240, 242, 244, 245, 247 and 249 in the hierarchical object classification scheme 200 (simultaneously or sequentially) until the object is classified as a member of a particular class.

As discussed below in conjunction with FIG. 5, a recognition scheme in accordance with the present invention uses a decision criterion based upon recognition error rather than reconstruction error for the purpose of categorization.

In one embodiment, a generic object is represented in the model in terms of gradient feature vectors of its appearance space. The exemplary features used in the RBF models described herein are gradients of the image data, and they are described by way of example only and not to limit the scope of the invention. Those skilled in the art will appreciate that other features may also be used in addition to other types of gradients. The feature vectors of semantically related objects are combined to construct an appearance space of the categories in the tree 200. This is based on the notion that construction of the appearance space using multiple views of an object is equivalent to that of using the feature vectors of the appearance space of each of that object. For animate objects, the feature vectors for the face space (node 240) are also constructed, since face information provides an accurate way to differentiate between people and other objects. Furthermore, the body posture (node 242) of the individual under consideration is also modeled as it is important to ascertain if the person is sitting or standing.

Instead of directly using image information, the exemplary embodiment uses gradients as a means for building the feature vectors. Since objects are classified under various poses and illumination conditions, it would be non-trivial if not impossible to model the entire space that the instances of a certain object class occupy given the fact that instances of the same class may look very different from each other (e.g., people wearing different clothes). Instead, features that do not change much under these different scenarios are identified and modeled. The gradient is one such feature since it reduces the dimension of the object space drastically by only capturing the shape information. Therefore, horizontal, vertical and combined gradients are extracted from the input intensity image and used as the feature vectors.

A gradient based appearance model is then obtained for the classes to be classified, using an RBFN. Once the model is learned by the RBFN training process 400, discussed below in conjunction with FIG. 4, recognition by the hierarchical classification process 500 then involves traversing the non-linear state-space model, to ascertain the overall identity by finding out the number of states matched in that model space.

For a more detailed discussion of the extraction of horizontal, vertical and combined gradients from the input intensity images for use as the feature vectors, see, for example, U.S. patent application Ser. No. 09/794,443, filed Feb. 27, 2001, entitled "Classification of Objects Through Model Ensembles," incorporated by reference herein. Generally, the process involves processing a collection of sequences of a set of model objects, and extracting horizontal, vertical and combined gradients for each object to form a set of image vectors corresponding to each object. Thereafter, a RBF network is generated for each such set of image vectors and a hierarchy of appearance classes is constructed using the information about categories, such as the hierarchical object classification scheme 200 of FIG. 2.

Figure 3:
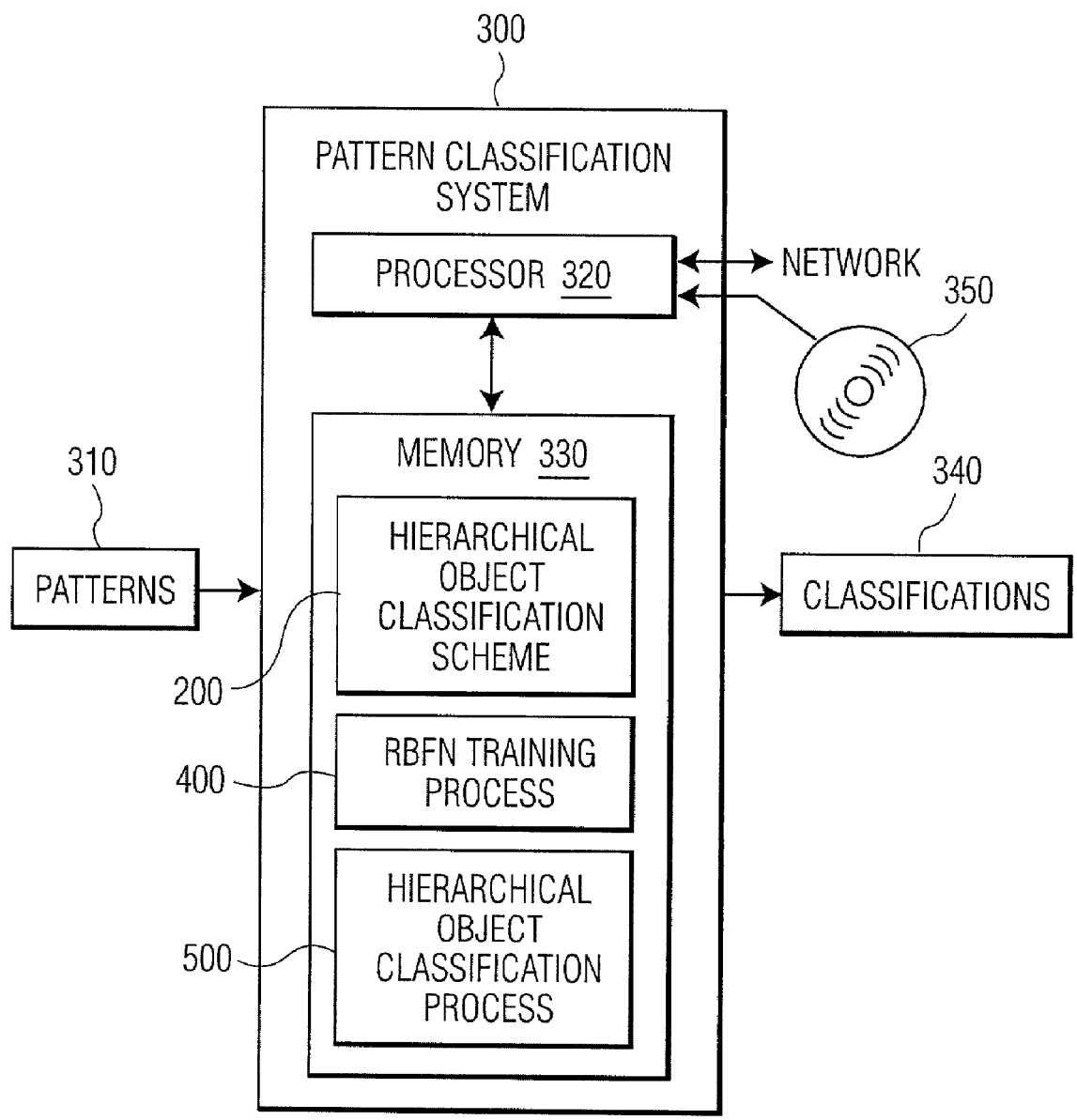
FIG. 3 is an illustrative pattern classification system using the exemplary hierarchical object classification scheme of FIG. 2, in accordance with the present invention.

FIG. 3 is an illustrative pattern classification system 300 using the hierarchical object classification scheme 200 of FIG. 2, in accordance with a preferred embodiment of the invention. FIG. 3 comprises a pattern classification system 300, shown interacting with input patterns 310 and Digital Versatile Disk (DVD) 350, and producing classifications 340.

Pattern classification system 300 comprises a processor 320 and a memory 330, which itself comprises the hierarchical object classification scheme 200, discussed above in conjunction with FIG. 2, an RBFN training process 400, discussed below in conjunction with FIG. 4, and a hierarchical object classification process 500, discussed below in conjunction with FIG. 5. Pattern classification system 100 accepts input patterns and classifies the patterns. For example, the input patterns could be images from a video, and the pattern classification system 300 can be used to distinguish humans from pets (nodes 230 and 233 in the hierarchical object classification scheme 200).

The pattern classification system 300 may be embodied as any computing device, such as a personal computer or workstation, containing a processor 320, such as a central processing unit (CPU), and memory 330, such as Random Access Memory (RAM) and Read-Only Memory (ROM). In an alternate embodiment, the pattern classification system 300 disclosed herein can be implemented as an application specific integrated circuit (ASIC), for example, as part of a video processing system.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks such as DVD 350, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer readable code means is any mechanism for allowing a computer to read instructions and data, such as magnetic variations on a magnetic media or height variations on the surface of a compact disk, such as DVD 350.

Memory 330 will configure the processor 320 to implement the methods, steps, and functions disclosed herein. The memory 330 could be distributed or local and the processor 320 could be distributed or singular. The memory 330 could be implemented as an electrical, magnetic or optical memory, or any combination of these or other types of storage devices. The term "memory" should be construed broadly enough to encompass any information able to be read from or written to an address in the addressable space accessed by processor 320. With this definition, information on a network is still within memory 350 of the pattern classification system 300 because the processor 320 can retrieve the information from the network.

Figure 4:
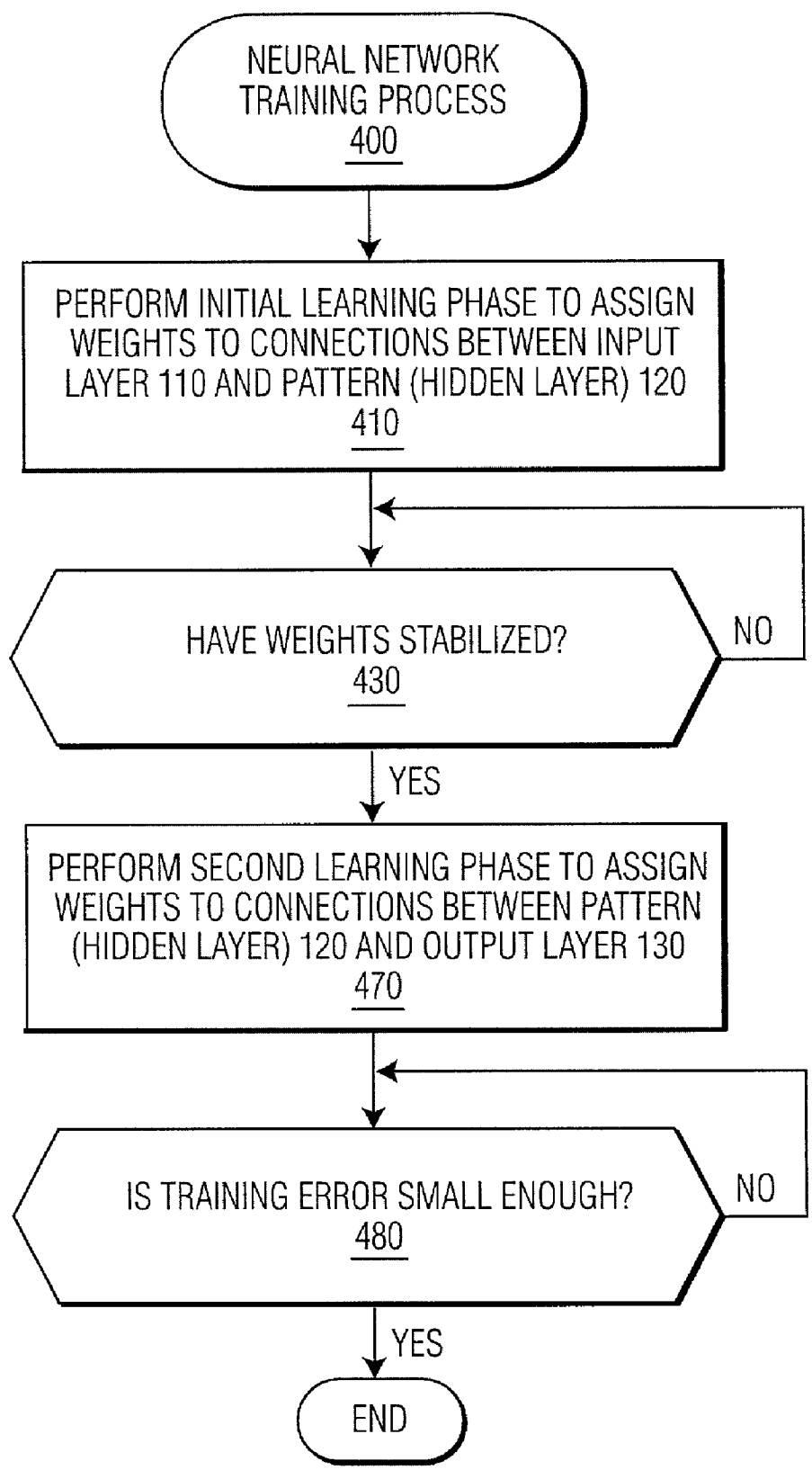
FIG. 4 is a flow chart describing an exemplary method for training the pattern classification system of FIG. 3.

FIG. 4 is a flow chart describing an exemplary implementation of the RBFN training process 400 of FIG. 3. As is known in the art, training a pattern classification system is generally performed in order for the classifier to be able to categorize patterns into classes. Generally, the RBFN training process 400 is employed to train each of the Radial Basis Function neural networks 100 in the hierarchical object classification scheme 200, using image data from an appropriate ground truth data set that contains an indication of the correct object classification. As previously indicated, RBF neural networks associated with leaf nodes in tree 200 are trained using image data that is known to belong to the class associated with the node. For RBF neural networks associated with other (non-leaf) nodes in the hierarchical object classification scheme 200, the RBF neural network 400 is trained using training data from the nodes below the node that is being trained. In other words, a node from a higher level of the hierarchy 200 is formed by repeatedly combining classes from the descendent nodes (e.g., child and grandchild nodes) of the given node.

As previously indicated, each of the connections in the Radial Basis Function neural network 100 between the input layer 110 and the pattern (hidden layer) 120 and between the pattern (hidden layer) 120 and the output layer 130 are assigned weights during the training phase.

As shown in FIG. 4, the exemplary RBFN training process 400 initially performs an initial learning phase during step 410 to assign weights to the connections in the Radial Basis Function neural network 100 between the input layer 110 and the pattern (hidden layer) 120. Generally, step 410 estimates the location of the radial-basis function centers using an unsupervised learning method, such as a K-means clustering technique, as described in R. O. Duda and P. E. Hart, Pattern Classification and Scene Analysis, John Wiley & Sons (1973), incorporated by reference herein.

A test is performed in a known manner during step 430 to determine if the weights have stabilized. If it is determined during step 430 that the weights have not stabilized, then program control returns to step 430 until the weights have stabilized. Once it is determined during step 430 that the weights have stabilized, then program control proceeds to step 470 where a second learning phase is initiated.

The second learning phase performed during step 470 assigns weights to the connections in the Radial Basis Function neural network 100 between the pattern (hidden layer) 120 and the output layer 130. For example, a linear regression or gradient descent technique may be employed during step 470 to determine the appropriate weights, in a known manner.

A test is performed during step 480 to determine if the training error is small enough. For example, the weight training may continue until the error rate stops improving by some predefined minimum amount. If it is determined during step 480 that the training error is not small enough, then program control returns to step 470 until the training error is small enough. Once it is determined during step 480 that the training error is small enough, then program control proceeds to step 490 where program control terminates. It is noted that the Radial Basis Function neural network 100 can optionally be retrained over time, or in real-time, to improve performance as more ground truth data gets collected.

For a further discussion of training techniques for Radial Basis Function classifiers 100, see, for example, U.S. patent application Ser. No. 09/794,443, filed Feb. 27, 2001, entitled "Classification of Objects Through Model Ensembles," incorporated by reference herein.

Figure 5:
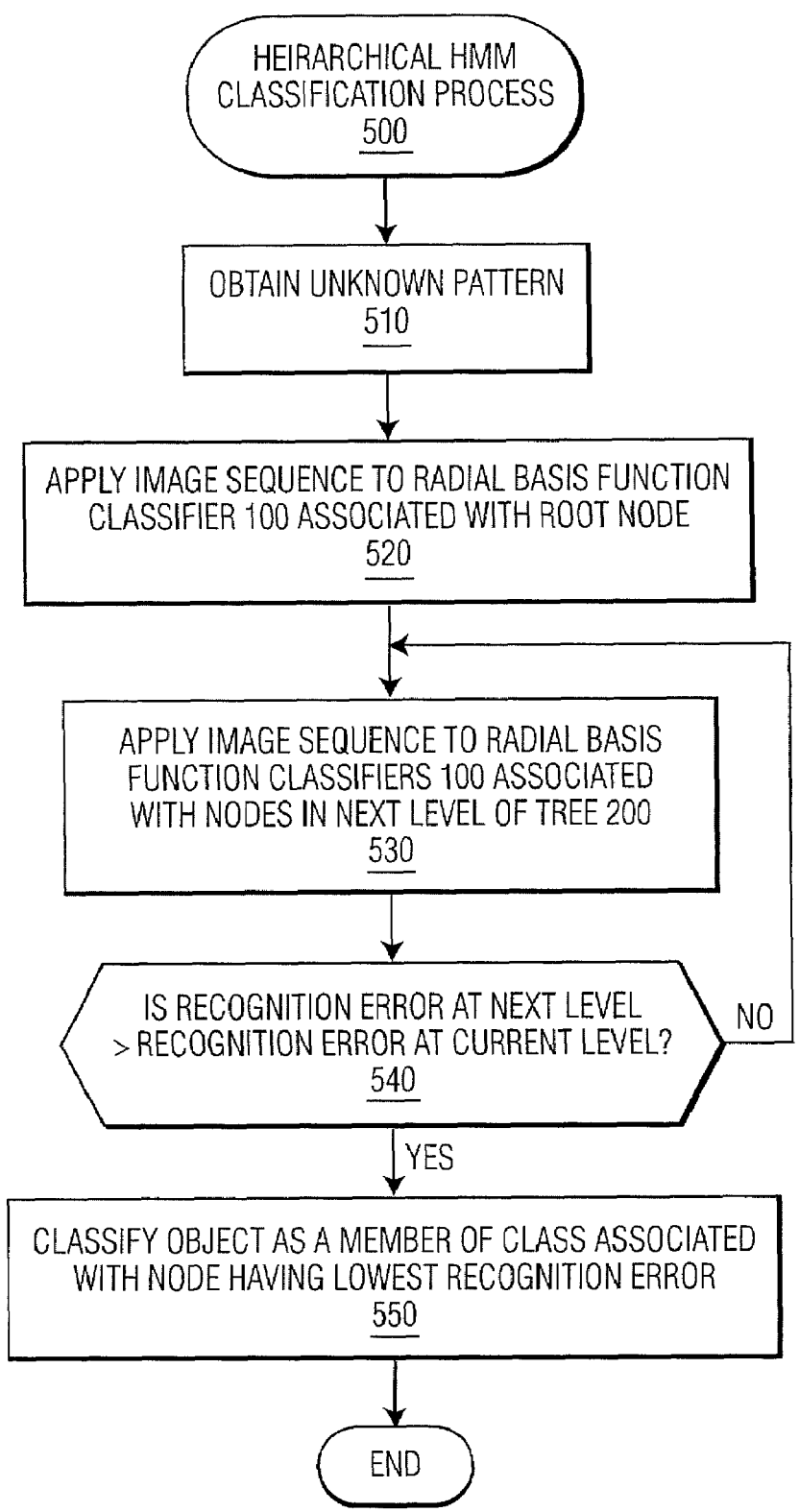
FIG. 5 is a flow chart describing an exemplary method for using the pattern classification system of FIG. 3 for pattern recognition and classification.

FIG. 5 is a flow chart describing an exemplary method 500 for using the system and classifier of FIG. 3 for pattern recognition and classification. Method 500 is used during normal operation of a classifier, and the method 500 classifies patterns. The exemplary implementation of the hierarchical classification process 500 performs a top-down object classification and employs a recognition error criterion, in accordance with the present invention.

As shown in FIG. 5, the hierarchical classification process 500 begins in step 510, when an unknown pattern is presented or obtained. It is noted that the image can be preprocessed to filter out unintended moving objects from detected moving objects, for example, according to a detected speed and aspect ratio of each detected moving object, in a known manner.

During step 520, the image sequence of the unknown object is initially applied to the Radial Basis Function classifier 100 associated with the highest level (i.e., the root node 210) of the hierarchical object classification scheme 200 to compute the recognition error.

Thereafter, the image sequence of the unknown object is applied during step 530 to the Radial Basis Function classifiers 100 associated with the nodes in the next lower level of the hierarchical object classification scheme 200 to compute the recognition error.

A test is performed during step 540 to determine if the recognition error at next level is higher than the recognition error at the current level. If it is determined during step 540 that the recognition error at next level is higher than the recognition error at the current level, then program control proceeds to step 550, discussed below.

If, however, it is determined during step 540 that the recognition error at next level is not higher than the recognition error at the current level, then program control returns to step 530 to continue processing another level in the manner described above, until the node having the lowest recognition error is identified. The object is then classified as a member of the class associated with the node having the lowest recognition error during step 550, before program control terminates.

It is noted that the hierarchical classification process 500 can be modified to include learning steps that can add new classes to the hierarchical object classification scheme 200, as would be apparent to a person of ordinary skill.

It is to be understood that the embodiments and variations shown and described herein are merely illustrative of the principles of this invention and that various modifications may be implemented by those skilled in the art without departing from the scope and spirit of the invention.

What is claimed is:

1. A method for classifying an object in image data, comprising:
   detecting an object in said image data;
   classifying said object using a hierarchical object classification scheme defined by providing a candidate class for the detected object with an increasing degree of specificity as a hierarchy of classes is traversed from a root node to a leaf node; and
   outputting a class label to identify said candidate class to which the detected object corresponds to and a probability value to indicate a probability with which the detected object belongs to said candidate class.

2. The method of claim 1, wherein said hierarchical object classification scheme employs appearance based feature data.

3. The method of claim 1, wherein said detecting comprises subtracting a background scene from the image data.

4. The method of claim 1, further comprising filtering out unintended moving objects from the detected moving object.

5. The method of claim 4, wherein said filtering comprises filtering out the unintended moving objects according to a detected speed and aspect ratio of the detected moving object.

6. The method of claim 1, further comprising extracting at least two of x-gradient, y-gradient, and combined xy-gradient features from the detected object.

7. The method of claim 1, wherein the classifying comprises using a classifier associated with one or more nodes in said hierarchical object classification scheme.

8. The method of claim 7, wherein said classifier comprises a Radial Basis Function Network for training and classifying the detected object.

9. The method of claim 1, wherein the classifying comprises outputting said class label based upon a recognition error.

10. The method of claim 1, wherein the classifying comprises evaluating a recognition error of nodes in said hierarchical object classification scheme using a top-down approach.

11. A method for classifying an object in image data, comprising:
    detecting an object in said image data;
    evaluating a recognition error for said object for one or more nodes in a hierarchical object classification scheme, until a node having a lowest recognition error is identified, said hierarchical object classification scheme defined by providing a candidate class for the detected object with an increasing degree of specificity as a hierarchy of classes is traversed from a root node to a leaf node; and
    outputting a class label to identify said candidate class to which the detected object corresponds to and a probability value to indicate a probability with which the detected object belongs to said candidate class.

12. The method of claim 11, wherein the evaluating comprises using a classifier associated with one or more nodes in said hierarchical object classification scheme.

13. The method of claim 12, wherein said classifier comprises a Radial Basis Function Network for training and classifying at least one the detected object.

14. The method of claim 11, wherein the evaluating comprises evaluating said recognition error of nodes in said hierarchical object classification scheme using a top-down approach.

15. A system for classifying an object in image data, comprising:
    a memory that stores computer-readable code; and
    a processor operatively coupled to said memory, said processor configured to implement said computer-readable code, said computer-readable code configured to:
    detect an object in said image data;
    classify said object using a hierarchical object classification scheme defined by providing a candidate class for the detected object with an increasing degree of specificity as a hierarchy of classes is traversed from a root node to a leaf node; and
    output a class label to identify said candidate class to which the detected object corresponds to and a probability value to indicate a probability with which the detected object belongs to said candidate class.

16. The system of claim 15, wherein said hierarchical object classification scheme employs appearance based feature data.

17. The system of claim 15, wherein said processor is further configured to subtract a background scene from the image data.

18. The system of claim 15, wherein said processor is further configured to filter out unintended moving objects from detected moving objects.

19. The system of claim 15, wherein said processor is further configured to use a classifier associated with one or more nodes in said hierarchical object classification scheme.

20. A system for classifying an object in image data, comprising:
  a memory that stores computer-readable code; and
  a processor operatively coupled to said memory, said processor configured to implement said computer-readable code, said computer-readable code configured to:
  detect an object in said image data;
  evaluate a recognition error for said object for one or more nodes in a hierarchical object classification scheme, until a node having a lowest recognition error is identified, said hierarchical object classification scheme defined by providing a candidate class for the detected object with an increasing degree of specificity as a hierarchy of classes is traversed from a root node to a leaf node; and
  output a class label to identify said candidate class to which the detected object corresponds to and a probability value to indicate a probability with which the detected object belongs to said candidate class.

21. An article of manufacture for classifying an object in image data, comprising:
  a computer-readable medium having computer-readable code means embodied thereon, said computer-readable program code means comprising:
  detecting an object in said image data;
  classifying said object using a hierarchical object classification scheme defined by providing a candidate class for the detected object with an increasing degree of specificity as a hierarchy of classes is traversed from a root node to a leaf node; and
  outputting a class label to identify said candidate class to which the detected object corresponds to and a probability value to indicate a probability with which the detected object belongs to said candidate class.

22. An article of manufacture for classifying an object in image data, comprising:
  a computer-readable medium having computer-readable code means embodied thereon, said computer-readable program code means comprising:
  detecting an object in said image data;
  evaluating a recognition error for said object for one or more nodes in a hierarchical object classification scheme, until a node having a lowest recognition error is identified, said hierarchical object classification scheme defined by providing a candidate class for the detected object with an increasing degree of specificity as a hierarchy of classes is traversed from a root node to a leaf node; and
  outputting a class label to identify said candidate class to which the detected object corresponds to and a probability value to indicate a probability with which the detected object belongs to said candidate class.

* * * * *